(12) United States Patent
Callies

(10) Patent No.: US 6,374,853 B1
(45) Date of Patent: Apr. 23, 2002

(54) COMBINED PRESSURE REGULATOR AND SHUT-OFF VALVE

(75) Inventor: Robert E. Callies, Lehigh, NE (US)

(73) Assignee: Lindsay Manufacturing Company, Lindsay, NE (US)

( * ) Notice: Subject to any disclaimer, the term of this patent is extended or adjusted under 35 U.S.C. 154(b) by 0 days.

(21) Appl. No.: 09/727,181

(22) Filed: Nov. 30, 2000

(51) Int. Cl.⁷ .................................................. G05D 16/10
(52) U.S. Cl. ................................. 137/495; 137/505.25
(58) Field of Search ..................... 137/495, 505.25, 137/505.26

(56) References Cited

U.S. PATENT DOCUMENTS

| | | | |
|---|---|---|---|
| 614,441 A | 11/1898 | Burnett, Jr. | |
| 2,322,468 A | 6/1943 | Redrup | |
| 2,600,137 A | 6/1952 | Teague, Jr. | |
| 3,196,901 A | 7/1965 | Phillipps | |
| 3,367,360 A | * 2/1968 | Hickerson | 137/505.25 |
| 3,435,843 A | 4/1969 | Spencer | |
| 3,890,999 A | 6/1975 | Moskow | |
| 3,945,686 A | * 3/1976 | Orzel | 137/505.25 |
| 4,501,290 A | * 2/1985 | Sturman et al. | 137/495 |
| 4,516,600 A | * 5/1985 | Sturman | 137/495 |
| 4,543,985 A | 10/1985 | Healy et al. | |
| 4,745,904 A | * 5/1988 | Cagle | 137/495 |
| 4,905,723 A | * 3/1990 | Pritchard et al. | 137/505.26 |
| 5,257,646 A | 11/1993 | Meyer | |
| 5,348,269 A | 9/1994 | Moseley | |
| 5,396,918 A | 3/1995 | Parker | |
| 5,860,447 A | 1/1999 | Chu | |
| 5,875,815 A | 3/1999 | Ungerecht et al. | |
| 5,881,757 A | 3/1999 | Kuster et al. | |

* cited by examiner

Primary Examiner—Stephen M. Hepperle
(74) Attorney, Agent, or Firm—Cook, Alex, McFarron, Manzo, Cummings & Mehler, Ltd.

(57) ABSTRACT

A regulator valve has a housing with a seal member therein. First and second plungers are movable in the housing toward and away from the seal member. The plungers are sealed to the housing and have passages therethrough. The plungers are biased toward the seal member by fluid pressure at the housing outlet end. The plungers are biased away from the seal member by a spring. First and second diaphragms connected to the plungers engage the housing inner wall in sealing engagement so that fluid must flow through the passages. The diaphragms and housing define an expansion chamber. A port in fluid communication with the expansion chamber allows selectable introduction of pilot pressure into the expansion chamber to force the first plunger into engagement with the seal member and prevent flow through the passages.

23 Claims, 4 Drawing Sheets fig.4.  fig.5.

COMBINED PRESSURE REGULATOR AND SHUT-OFF VALVE

BACKGROUND OF THE INVENTION

This invention relates to a fluid flow control device that combines the functions of pressure regulation and selectable flow control. That is, the device regulates the pressure at the outlet to a predetermined value and it responds to a suitable control signal to permit or prevent fluid flow. The device will be referred to herein as a regulator valve. The device is particularly suitable for use on agricultural irrigation machines, although it is not limited to this use.

Agricultural irrigation machines of the type known as center pivot machines have a main pipeline supported on movable towers for rotation about an inner end of the pipeline. Water (with or without added fertilizer, herbicide, insecticide etc.) is supplied to the fixed, inner end of the pipeline. Sprinkler heads are mounted at intervals along the length of the pipeline for distributing the water. The sprinkler heads can be mounted more or less directly to the pipeline or at the end of tubular drop mechanisms that suspend the sprinkler heads just above or within the crop canopy. In either case the flow rate of water through a sprinkler head is dependent on the hydraulic pressure at the inlet of the sprinkler head. That pressure can vary along the length of the pipeline due to friction losses in the pipe and undulations in the local terrain. When it is critical to control the flow rate through a sprinkler head a pressure regulator is placed between the pipeline and the sprinkler heads to assure a known hydraulic pressure at the sprinkler head's inlet, regardless of its location along the length of the pipeline or undulations in the local terrain. A typical pressure regulator of this type is shown in U.S. Pat. No. 4,543,985.

In some applications it may be also desirable to be able to turn individual sprinkler heads on or off, in addition to controlling the pressure seen by the inlet of the head. Examples where this would be advantageous include a center pivot machine having a swing span pivotably connected to the moving end of the pipeline. The swing span swings into the corners of a field to irrigate portions that would otherwise be missed by the circular pattern covered by the main pipeline. The swing span folds in when the main pipeline is opposite an edge of the field and swings out into a corner. U.S. Pat. Nos. 4,011,990 and 5,695,129 describe such a machine. The main pipeline may stop while the swing span irrigates the corner portion. In that case, it would be desirable to turn off the main pipeline sprinklers. The swing span sprinklers need to be off when the swing span is not irrigating a corner. Another example where on-off control is desirable is where field conditions are known to vary from one location to another and the irrigation machine is programmed to apply water and/or chemicals at differing rates dependent on these known field conditions.

While prior art pressure regulators provide adequate pressure regulation, none of the known regulators incorporates a selectable on-off feature. The present invention adds this capability to furnish a combined regulator and control valve.

SUMMARY OF THE INVENTION

The present invention concerns a regulator valve for regulating fluid pressure and selectably turning flow on or off. The valve has a housing defining a hollow enclosure with inlet and outlet ends. Inside the housing is a seal member and a spool assembly which are movable relative to one another. The spool assembly has a passage through it and is sealed to the housing such that fluid flow from the inlet to the outlet must go through the passage. When the spool assembly engages the seal member the passage is closed and flow through the device is prevented. The spool assembly is exposed to fluid pressure at the outlet end to bias the spool assembly toward the seal member. A spring engages the housing and the spool assembly to bias the spool assembly away from the seal. Balancing of the spring force and fluid pressure controls the separation between the seal member and the passage in the spool assembly, thereby governing the pressure at the outlet of the regulator valve.

The spool assembly includes first and second plungers each connected to first and second flexible diaphragms, respectively. Each diaphragm contacts the inner wall of the housing in sealing engagement. The diaphragms and plungers, together with the housing, define an expansion chamber. A port provides fluid communication to the expansion chamber. Pilot pressure introduced into the expansion chamber biases the first plunger toward the seal member. The pilot pressure is sufficient to overcome the spring force and press the first plunger against the seal member, thereby closing the passages through the plungers and stopping flow through the device. Release of the pilot pressure in the expansion chamber allows the flow to resume under the normal balance of forces on the spool assembly. Pilot pressure may advantageously be taken from the main pipeline under the control of a solenoid valve or it may be separately supplied pneumatic pressure.

DETAILED DESCRIPTION OF THE INVENTION

Figures 1, 2, 3:
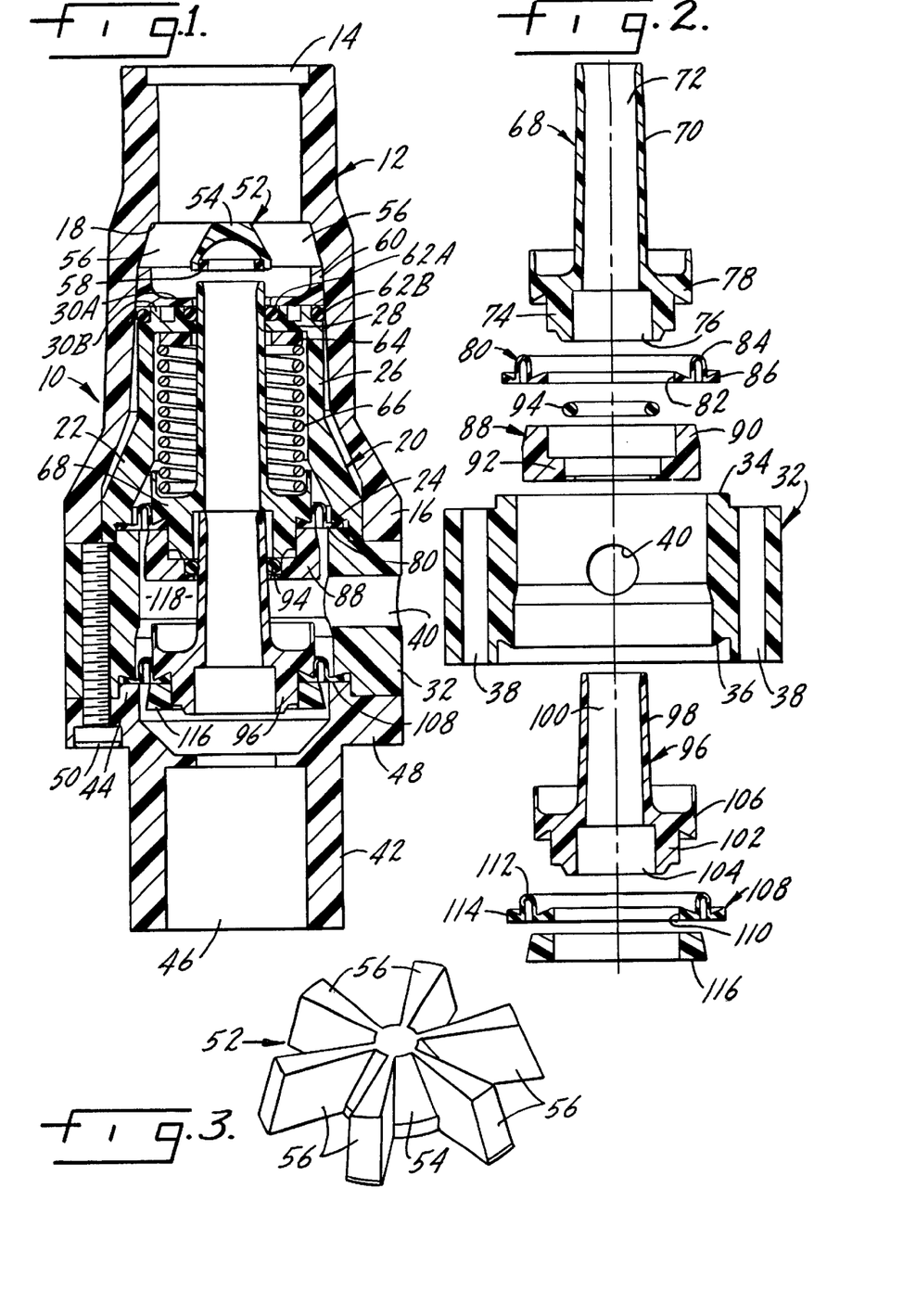
FIG. 1 is a section through the regulator valve of the present invention, shown in a balanced condition.
FIG. 2 is an exploded section through portions of the regulator valve showing the spool assembly and central valve body.
FIG. 3 is a perspective view of the diffuser.

The regulator valve of the present invention is shown generally at 10 in FIG. 1. The regulator valve includes a housing which defines a hollow enclosure, an inlet end and an outlet end. The housing is made of four separate pieces which will now be described. The first piece of the housing is an inlet body 12 which has an inlet end 14 and a collar 16 of enlarged diameter. The inner wall of the inlet body has a shoulder 18 formed therein.

The second portion of the housing is a spring sleeve 20. The spring sleeve has a conical portion 22 which terminates at a foot 24. The outer diameter of foot 24 engages the inside diameter of the inlet body's collar 16. The sleeve 20 also has a cylindrical portion 26 that terminates at a rim 28 which is directed radially inwardly from the walls of the cylindrical portion. Inner and outer upstanding annular rings 30A, 30B are formed on top of the rim 28.

The third member of the housing is a central valve body 32 which is best seen in FIG. 2. This is a relatively thick-walled tubular member having a top land 34 and a bottom land 36. A plurality of bolt holes 38 extend through the wall of the central valve body. A radial inlet port 40 extends through the wall of the central valve body.

The fourth and final piece of the housing is an outlet body 42. The outlet body. has a tubular wall defining a head 44 at one end and an outlet 46 at the opposite end. A bolt circle 48 extends radially from the wall of the outlet body, just below the head end. The bolt circle receives a plurality of self-threading screws, one of which is shown at 50. The heads of the screws engage the bolt circle 48 as shown in FIG. 1. The shanks of screws 50 extend through the bolt holes 38 of the central valve body 32. The screws self-thread into openings in the collar 16 of the inlet body 12. The screws compress the central valve body 32 between the outlet body 42 and the combination of the inlet body 12 and spring sleeve 20. While self-threading screws are shown for the purpose of holding the housing parts together, it will be understood that other methods of holding the housing together could be used. For example, a lip and bead arrangement could be used to snap fit the pieces together.

The hollow enclosure of the housing has several additional non-movable components mounted therein. These, include a diffuser 52 which is illustrated in FIG. 3. The diffuser has a conical core 54 from which six spaced radial vanes 56 extend. The top edges of the vanes engage the shoulder 18 of the inlet body while the outer or free ends of the vanes 56 engage the inner surface of the inlet body at a point just below the shoulder 18, as seen in FIG. 1. The underside of the conical core 54 mounts a seal member 58. The seal member is illustrated as a ring made of elastomeric material.

The diffuser 52 is pressed in place against the shoulder 18 by a retainer 60. The retainer has a generally circular plate with a central opening therethrough and an upstanding wall surrounding the edge of the plate. The plate holds inner and outer O-ring seals 62A, 62B in seats formed by the rings 30A and 30B on top of the spring sleeve 20. The inner O-ring 62A seals against the outer surface of the first plunger which will be described below. The outer O-ring 62B seals against the inside wall of the inlet body 12.

Just below the rim 28 of the spring sleeve is a shim washer 64. The shim washer is a bearing surface for one end of a spring 66. The other end of the spring engages the spool assembly as will be described below.

Looking now at FIG. 2, the components of the spool assembly are shown in an exploded view. The spool assembly includes a first plunger 68. The first plunger has an elongated tubular stem 70 which defines a passage 72 therethrough. At the lower end of the stem 70 is a base of enlarged diameter, with a counterbore 76 formed in the base. The counterbore forms an extension of the passage 72. A flange 78 extends from the base 74. The end of the spring 66 opposite the shim washer 64 engages the upper side of the flange 78 of the first plunger 68.

Associated with the first plunger 68 is a first diaphragm 80. The first diaphragm is a generally ring-shaped member having an inner edge 82, a rolled bead portion 84 and an outer edge 86. A central opening in,the diaphragm receives the base portion 74 of the first plunger so that the inner edge 82 butts up against the underside of the flange 78. The diaphragm is held in that position by a first diaphragm retainer 88. The first diaphragm retainer has a tubular wall 90 and an inwardly extending portion 92 which forms a seat for an O-ring seal 94. The tubular wall 90 fits snugly about the base 74 of the first plunger and holds the inner edge 82 of the diaphragm pressed against the underside of the flange 78. The outer edge 86 of the first diaphragm rests on top of the top land 34 of the central valve body 32. It is compressed by the central valve body against the foot 24 of the spring sleeve 20. The rolled bead portion 84 of the diaphragm allows the first plunger to move up and down within the spring sleeve.

The spool assembly further includes a second plunger 96. The second plunger has a shape similar to the first plunger and thus includes a tubular stem 98 defining a passage 100, a base 102 having a counterbore 104 and a flange 106. Similarly, there is a second diaphragm 108 associated with the second plunger 96. The second diaphragm has an inner edge 110, a rolled bead portion 112 and an outer edge 114. The inner edge 110 is pressed against the underside of the flange 106 by a second diaphragm retainer 116. The second diaphragm retainer has a central opening that receives the base 102 of second plunger 96. The second diaphragm retainer is assembled to the base to force the inner edge 110 of the second diaphragm against the underside of the flange 106. The outer edge 114 of the second diaphragm is trapped between the head 44 of the outlet body 42 and the bottom land 36 of the central valve body 32. This provides a sealing engagement of the spool assembly with the housing. The rolled bead 112 permits the second plunger to move toward and away from the first plunger.

It will be noted that the stem 98 of the second plunger fits inside the counter-bore 76 of the first plunger such that the passages 72 and 100 are aligned with one another and the stem of the second plunger is engageable with the bottom surface of the stem 70 of the first plunger. Also, the lower portions of the second diaphragm retainer 116 and the underside of the rolled bead portion 112 form a wetted surface which is exposed to fluid pressure at the outlet end 46 of the housing. This fluid pressure biases the second plunger upwardly as seen in FIG. 1, i.e., toward the seal member 58. By virtue of the engagement between the second plunger stem 98 and the first plunger stem 70, the first plunger is also urged upwardly by the pressure on the wetted surface of the second plunger.

The first and second diaphragms 80 and 108, together with the inner wall of the central valve body 32 and the first and second plungers, define an expansion chamber 118. The inlet port 40 is in fluid communication with the expansion chamber. While not shown, it will be understood that the inlet port is connected to a source of pilot pressure, either hydraulic or pneumatic. For example, a tube may connect the main pipeline of an irrigation machine to the inlet port, with a solenoid valve or other control means in the tube. Alternately, a pneumatic system could provide pressurized air from a suitable source, again with a control means in the pneumatic pilot line. The expansion chamber alternately receives or relieves pilot pressure fluid in accordance with the control means in the pilot pressure line. Thus, the underside of the first diaphragm retainer and the rolled bead portion 84 of the first diaphragm form a second wetted surface which is exposable to pilot pressure fluid in the expansion chamber 118.

It will be noted that the O-ring 94 engages the second plunger's stem 98 to prevent leakage of fluid from the passages 72, 100 into the expansion chamber 118. Similarly, O-ring 62A prevents leakage about the exterior of the stem 70. O-ring 62B prevents fluid from leaking between the spring sleeve 20 and the inlet body 12.

The use, operation and function of the invention are as follows.

FIG. 1 illustrates the regulator valve in a normal open flow condition. Water from a source such as the main irrigation pipeline enters the housing through the inlet end 14 of the inlet body 12. Water flows between the vanes 56 of the diffuser 52 and into the passage 72 of the first plunger's stem 70. Water then flows through the passage 100 of the second plunger 96 and out through the counterbore 104 into the outlet end 46 of the outlet body 42. From there it goes to the sprinkler head (not shown) which is attached to the outlet body 42. The water pressure at the outlet end acts on the wetted surface on the underside of the second diaphragm retainer 116 and second diaphragm 108 to urge the second plunger 96 upwardly, into contact with the first plunger 68 as shown in FIG. 1. Simultaneously, the spring 66 urges the first plunger downwardly. These two forces are in equipoise with a gap or separation between the top of the stem 70 and the seal member 58. This allows enough flow through the plunger passages to create a pressure at the outlet end that balances the spring force and creates the regulated desired pressure. It will be understood that the expansion chamber 118 is evacuated and the first and second plungers are in contact as shown in FIG. 1.

Figure 4:
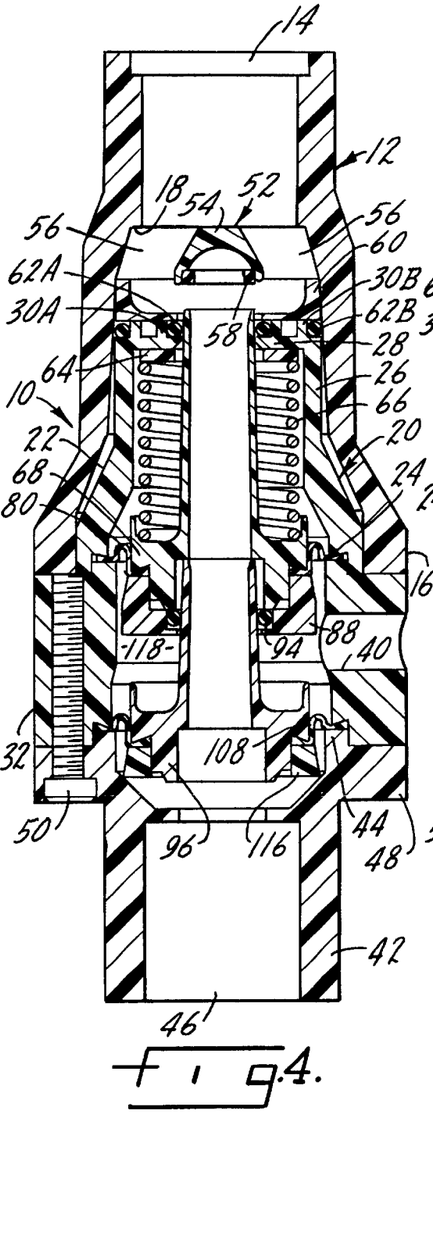
FIG. 4 is a section of the regulator valve, shown in an open condition.

In the absence of any water entering the inlet end 14, there will be no water pressure at the outlet end 46 and the regulator valve will take on the position shown in FIG. 4. Here the spring 66 is the only force acting on the spool assembly due to the absence of any counter balancing pressure at the outlet end of the housing.

Figure 5:
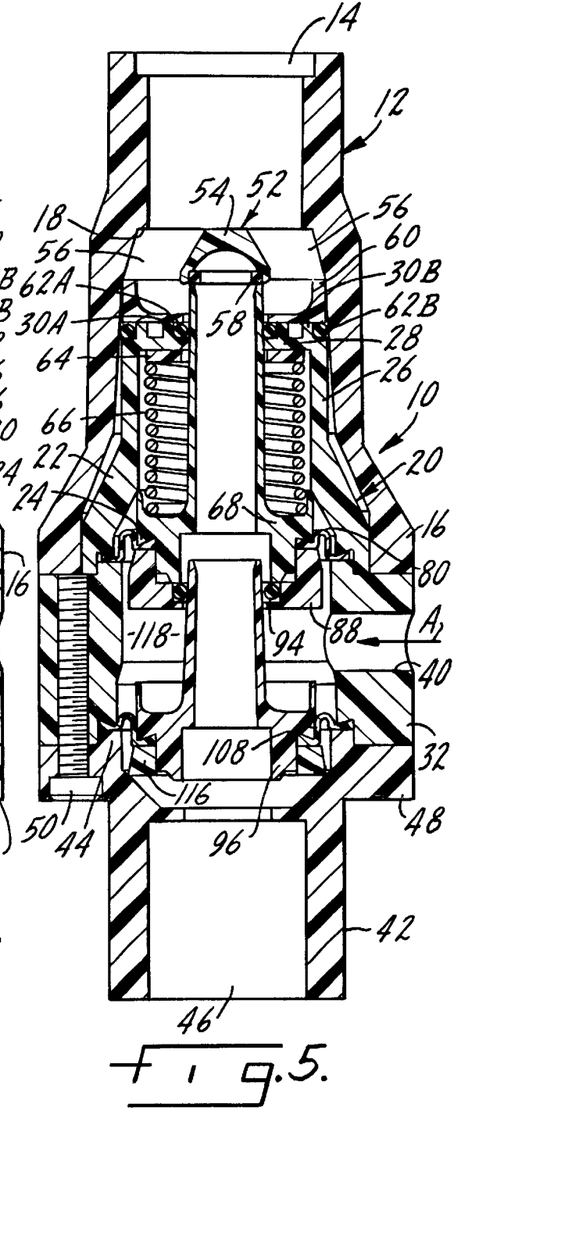
FIG. 5 is a section of the regulator valve, shown in a closed condition.

FIG. 5 shows the regulator valve in a closed condition. This results from the introduction of pilot pressure fluid through the inlet port 40 as indicated by the arrow A. As mentioned above, the pilot pressure may be provided by hydraulic pressure taken from the main irrigation pipeline or it could be pneumatic pressure taken from a suitable air source. Whatever pilot fluid used, the tube providing the pilot pressure has a control means, such as a solenoid valve, which can be selectively set to either introduce or release pilot pressure into or from the expansion chamber 118. When the pilot pressure is present in the expansion chamber, it acts on the wetted surface of the first diaphragm retainer 88 and the first diaphragm 80. The pilot pressure also acts to move the second plunger downwardly. The first plunger is moved upwardly against the force of the spring 66 until the top of the tubular stem 70 engages the seal member 58. This cuts off access to the passage 72 and no water will flow through the plunger passages. This means there is no pressure on the wetted surface of the second plunger but the pilot pressure in the expansion chamber 118 holds the first plunger in engagement with the seal member. Once the solenoid valve or other control means in the pilot pressure line is set to relieve the pressure in the expansion chamber, then the spring will again push the first plunger away from the seal member 58, thereby allowing reestablishment of flow through the diffuser vanes and into the passages. The normal pressure regulating functions will then be resumed as the regulator valve reestablishes the balanced condition shown in FIG. 1.

It can be seen that the introduction of pressure into the expansion chamber provides a secondary biasing means for urging at least a portion of the spool assembly into sealing engagement with the seal member. The primary biasing means can be thought of as the pressure at the outlet end of the housing but this can never be sufficient to close off the flow because as the flow closes, the pressure at the outlet end diminishes and allows the spring to prevent complete closure of the first plunger. The secondary biasing means is not limited by the pressure available at the outlet end and is, of course, independent of that pressure. It will be understood that while a pneumatic or hydraulic secondary biasing means is shown, other forms of an actuator could be used to push the first plunger into engagement with the seal member. For example, a motor and gear arrangement could be used or a motor and cam might be used to effect movement of the first plunger. Similarly, a solenoid may be effective to push the spool assembly into engagement with the seal member.

Figures 6, 7:
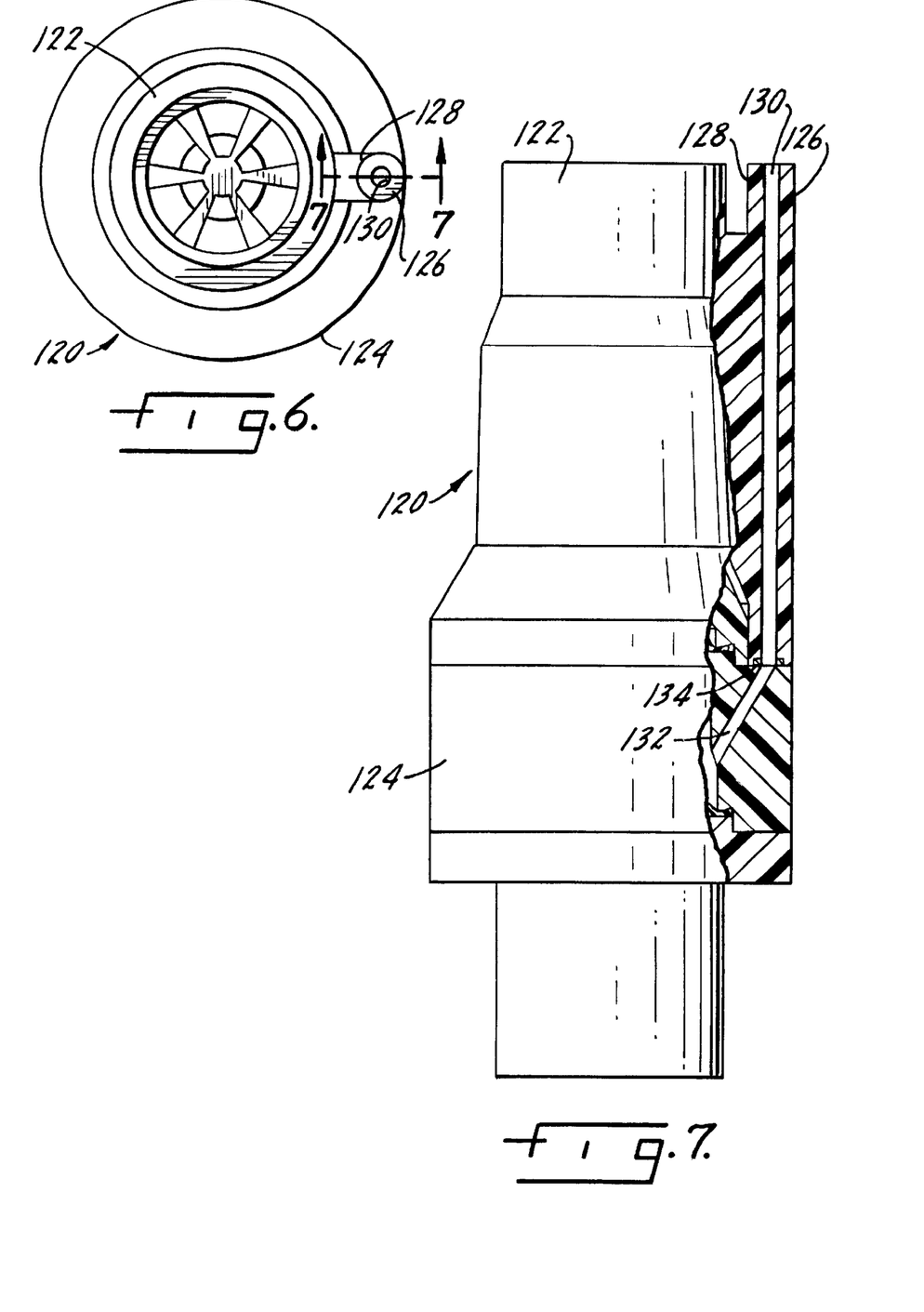
FIG. 6 is a plan view of an alternate embodiment of a regulator valve.
FIG. 7 is a section taken along line 7—7 of FIG. 6.

FIGS. 6 and 7 illustrate an alternate embodiment of the invention at 120. Regulator valve 120 has a housing including an inlet body 122 and a central valve body 124. These parts are similar in many respects to inlet body 12 and central valve body 32 with the exception that they have a different inlet port arrangement. Inlet body 122 has a radially protruding extension portion 126 that extends the fall axial length of the inlet body. The extension portion terminates at its upper end at a nipple 128. The nipple forms a convenient connection point for a pilot fluid line or tube. An inlet passage 130 is formed in and through the extension portion 126. The inlet passage 130 communicates with an inlet port 132 which extends obliquely through the central valve body 124. The inlet port 132 terminates at the expansion chamber. A seal 134 prevents leakage at the junction of the inlet passage 130 and the inlet port 132. The other components of the regulator valve 120 are similar to valve 10 and their description will not be repeated.

Figure 8:
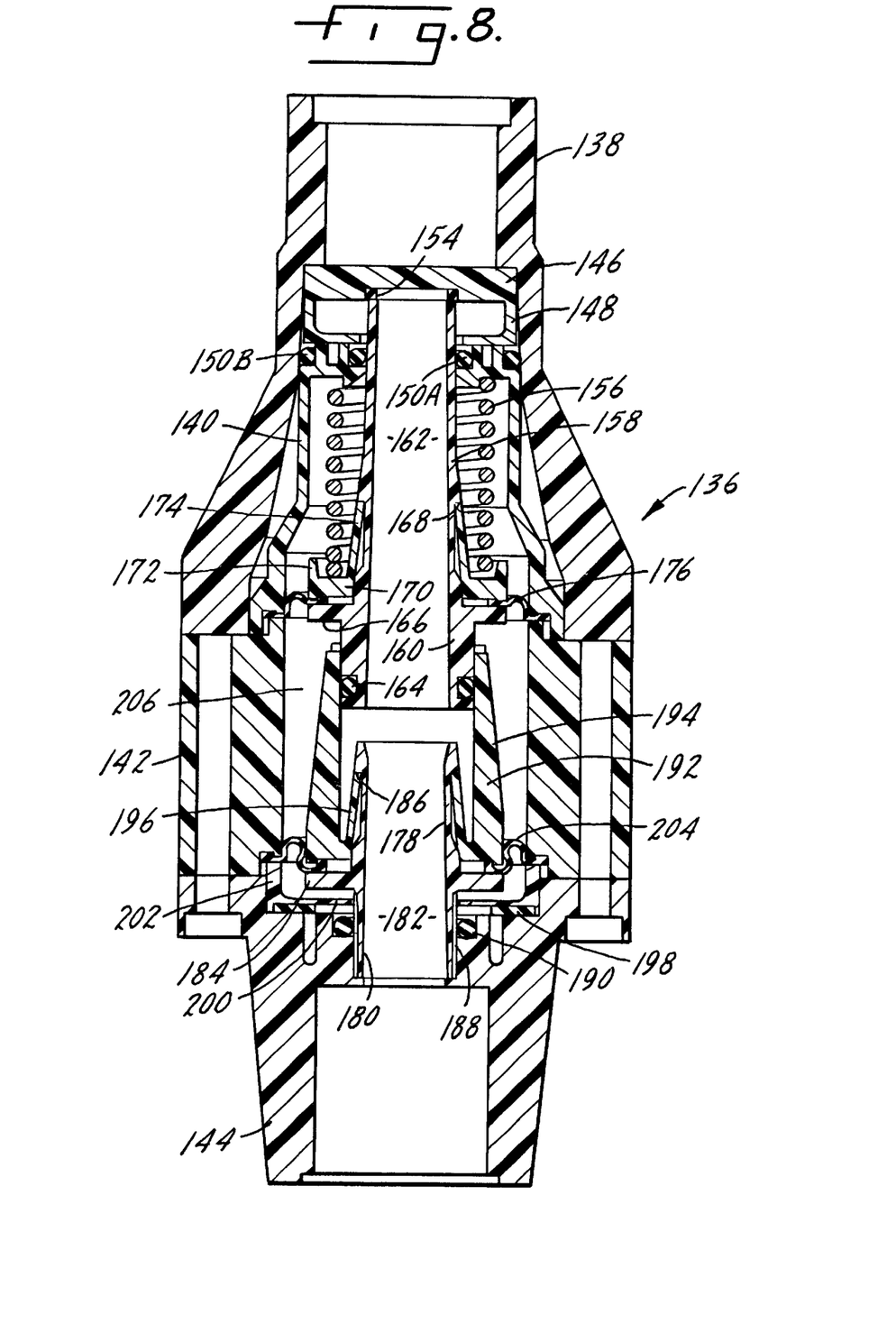
FIG. 8 is a section through a further alternate embodiment of a regulator valve, shown in a closed condition.

Another possible alternate construction is shown in FIG. 8. Regulator valve 136 has numerous components that correspond to those of regulator valve 10 in FIG. 1. These corresponding components perform similarly despite slight variations in configuration. Accordingly, they will be described here only briefly, it being understood that the functions are similar. A housing comprises an inlet body 138, a spring sleeve 140, a central valve body 142 and an outlet body 144. Although it does not show in the section of FIG. 8, it will be understood that the central valve body 142 has a port similar to port 40. A diffuser 146 is placed in the inlet body 138. The diffuser is similar to diffuser 52 in that it has several spaced radial vanes that allow passage of water between the vanes. The diffuser 146 has an integral retainer portion 148 that performs similarly to the separate retainer 60. Inner and outer O-ring seals 150A and 150B are held between the retainer 148 and the top of the spring sleeve 140. The diffuser 146 mounts a seal member 154 on its underside. The upper end of a spring 156 abuts the underside of the spring sleeve 140.

The spool assembly of regulator valve 136 differs somewhat from that of the FIG. 1 version. The primary difference is the diaphragm retainers are located above the plunger flanges instead of below them. Looking at the spool assembly in detail, it includes a first plunger 158 having an elongated tubular stem 160 with a passage 162 therethrough. The lower end of the stem has a seat for a seal 164. A flange 166 extends radially from the stem 160. A portion of the stem wall has a reduced thickness to define a notch 168 on the outer surface of the stem. A first diaphragm retainer 170 includes an annular base portion 172 and an upstanding web 174 that fits into the notch 168 of the first plunger to fix the retainer 170 on the plunger 158. The lower end of spring 156 abuts the surface of base portion 172. A first diaphragm 176 is similar to diaphragm 80. Its inner edge is trapped between the plunger's flange 166 and the retainer's base portion 172. The outer edge of the first diaphragm is held between the spring sleeve 140 and the valve body 142. The diaphragm permits up and down movement of the first plunger into and out of engagement with the seal member 154.

The spool assembly further includes a second plunger 178. The second plunger has a stem 180 and passage 182, a flange 184 and a notch 186. The portion of the stem below the flange has an axial groove 188 on its exterior surface. A dynamic damper 190 surrounds this portion of the stem to prevent chatter. A second diaphragm retainer 192 includes an upstanding sleeve 194 and a web 196. The web fits into the notch 186 to fix the retainer 192 on the plunger stem 180. The upper end of sleeve 194 receives the lower end of the first plunger's stem 160 in a water-tight fit afforded by seal 164. The length of the sleeve 194 is such that contact between the plunger stems 160-and 180 is prevented. That is, the top end of the sleeve will engage the underside of flange 166 before the stems contact each other.

There is a counterbore in the top surface of the outlet body that mounts a flat seal ring 198. Resting on top of the seal ring 198 is a support plate 200. The support plate has an annular rim 202 around its outer diameter and a central opening through which the stem 180 extends. The opening is spaced from the stem. A second diaphragm 204 has its inner edge trapped between the second plunger's flange 184 and the bottom of the second retainer's sleeve 194. The outer edge of the diaphragm is held between the valve body 142 and the rim 202 of support plate 200. The second diaphragm 204 permits up and down movement of the second plunger 178. The two diaphragms 176, 204, the valve body 142, the first plunger flange 166, the lower portion of stem 160 and the sleeve 190 define an expansion chamber 206.

Operation of regulator valve 136 is similar to that of valve 10. Consider first the condition in which the expansion chamber 206 is evacuated. Water from the main irrigation pipeline enters the inlet body 138, flows past the vanes of the diffuser 146, through the passages 162 and 182 of the plungers 158 and 178 and out through the outlet body 144 to the sprinkler head (not shown). Water in the outlet body also flows up through the groove 188 and past the damper 190. The damper 190 is not a seal so the water is free to flow past the damper and past the support plate 200. Water pressure acts on the wetted surface on the underside of the flange 184 and second diaphragm 204 to urge the second plunger 178 upwardly. This carries the sleeve 194 into contact with the first plunger flange 166 of the first plunger 158. Simultaneously, the spring 156 urges the first plunger 158 downwardly. When these two forces balance there is a gap between the top of the stem 160 and the seal member 154, that allows enough flow through the plunger passages to create the desired regulated pressure at the outlet.

FIG. 8 shows the regulator valve 136 in a closed condition. This results from the introduction of pilot pressure into the expansion chamber 206. When the pilot pressure is present in the expansion chamber, it acts on the wetted surface of the first plunger flange 166 and the first diaphragm 176. The pilot pressure also acts to move the second plunger 178 downwardly. The first plunger 158 is moved upwardly against the force of the spring 156 until the top of the tubular stem 160 engages the seal member 154. This cuts off access to the passage 162 and no water will flow through the plunger passages. This means there is no pressure on the underside of the second plunger but the pilot pressure in the expansion chamber 206 holds the first plunger 158 in engagement with the seal member 154. Once the pilot pressure is relieved from the expansion chamber, then the spring 156 will again push the first plunger 158 away from the seal member 154, thereby allowing reestablishment of flow through the diffuser vanes and into the passages. The normal pressure regulating functions will then be resumed as the regulator valve reestablishes the balanced condition.

While a preferred form of the invention has been shown and described, it will be realized that alterations and modifications may be made thereto without departing from the scope of the following claims. For example, a variety of alternate flow pathways might be contrived to cause this apparatus to perform its desired function. For instance, a normally closed valve might be obtained by admitting a limited volume of pilot pressure into the expansion chamber by means of an internal or external passageway, thereby forcing the regulator valve to close until such time as the pressure within that chamber is relieved. Also, while the seal member 58 is shown to be contacted by an end face of the spool assembly, it is to be understood that variations of this sealing method which would contact the internal or external surfaces of the spool assembly might work as well as that shown. The seal member is illustrated as a ring made of elastomeric material, whereas any of various forms and materials might be utilized to effect the purpose of sealing the passageway. Further, the rolling diaphragms shown sealing between the spool assembly and the valve body could be substituted with other types of seals which perform the required function.

What is claimed is:

1. A regulator valve for regulating fluid pressure and selectively stopping fluid flow, comprising:

a housing defining a hollow enclosure, an inlet end and an outlet end;

a seal member disposed in the housing;

a spool assembly disposed in the housing and having a passage therethrough, the spool assembly engaging the interior of the housing in sealing relation such that fluid flowing from the inlet end to the outlet end must flow through said passage, the spool assembly and seal member being movable relative to one another with said passage being closed to fluid flow when the spool assembly engages the seal member;

one of the spool assembly and seal member having a wetted surface exposed to fluid pressure in the housing to bias said one of the spool assembly and seal member in one of the directions toward or away from the other;

a spring in the housing biasing said one of the spool assembly and seal member in the other of the directions toward or away from said one of the spool assembly and seal member; and secondary biasing means for selectively effecting relative movement between the spool assembly and seal member to move them into sealing engagement with one another and thereby close the passage.

2. The regulator valve of claim 1 wherein the secondary biasing means comprises a flexible first diaphragm connected to the spool assembly and the housing at a location axially spaced from the sealing engagement of the spool assembly and housing to define an expansion chamber in the housing suitable for receiving pilot pressure fluid therein, and an inlet port in communication with the expansion chamber for introducing and relieving pilot pressure fluid, the spool assembly having a second wetted surface exposable to pilot pressure fluid in the expansion chamber such that upon introduction of pilot pressure fluid into the expansion chamber the spool assembly will move into engagement with the seal member.

3. The regulator valve of claim 2 further characterized in that the spool assembly comprises first and second plungers and the spool assembly engages the interior of the housing in sealing relation at a second diaphragm, the second diaphragm having an inner edge connected in sealing engagement to the second plunger and an outer edge connected in sealing engagement to the interior wall of the housing, the first diaphragm having an inner edge connected to the first plunger in sealing engagement and an outer edge connected in sealing engagement to an interior wall of the housing, the inlet port being intermediate the first and second diaphragms.

4. The regulator valve of claim 3 wherein the housing comprises an inlet body having a foot, an outlet body having a head and a central valve body between the inlet and outlet bodies and having top and bottom lands, the outer edge of the first diaphragm being held between the inlet body's foot and the central valve body's top land, the outer edge of the second diaphragm being held between the outlet body's head and the central valve body's bottom land.

5. The regulator valve of claim 4 wherein the inlet body comprises a spring sleeve including said foot.

6. The regulator valve of claim 3 further characterized in that each plunger includes a tubular stem, a flange extending from the stem, and a diaphragm retainer, the inner edge of each diaphragm being held between the flange and the diaphragm retainer.

7. The regulator valve of claim 6 wherein the spring engages the flange of the first plunger.

8. The regulator valve of claim 6 further characterized in that the tubular stems of the first and second plungers are engageable with one another in end-to-end fashion.

9. The regulator valve of claim 6 wherein the diaphragm retainer comprises a web engageable with the tubular stem to fix the diaphragm retainer on the plunger.

10. The regulator valve of claim 9 wherein the second diaphragm retainer further comprises a sleeve engageable with the tubular stem of the first plunger.

11. The regulator valve of claim 2 further characterized in that the spool assembly comprises first and second plungers, each plunger having a tubular stem and a flange extending from the stem, the spool assembly engages the interior of the housing in sealing relation at a second diaphragm, the first and second diaphragms being connected between the first and second tubular stems, respectively, and the interior wall of the housing, the inlet port being intermediate the first and second diaphragms.

12. The regulator valve of claim 1 further comprising a diffuser mounted in the housing, the seal member being attached to the diffuser.

13. A regulator valve for regulating fluid pressure and selectively stopping fluid flow, comprising:
a housing defining a hollow enclosure, an inlet end and an outlet end;
a seal member disposed in the housing;
a first plunger disposed in the housing and having a passage therethrough, the first plunger and seal member being movable relative to one another;
a second plunger disposed in the housing and having a passage therethrough, the first plunger being located between the second plunger and the seal member, the second plunger being movable into and out of engagement with the first plunger, the second plunger engaging the interior of the housing in sealing relation such that fluid flowing from the inlet end to the outlet end must flow through said passages, with said passages being closed to fluid flow when the first plunger engages the seal member;
one of the second plunger and seal member having a wetted surface exposed to fluid pressure in the housing to bias said one of the second plunger and seal member in one of the directions toward or away from the other;
a spring in the housing biasing the first plunger in the other of the directions toward or away from the seal member;
secondary biasing means for selectively moving the first plunger into sealing engagement with the seal member to close the passage.

14. The regulator valve of claim 13 wherein the secondary biasing means comprises a flexible first diaphragm connected to the first plunger and the housing at a location axially spaced from the sealing engagement of the second plunger and housing to define an expansion chamber in the housing suitable for receiving pilot pressure fluid therein, and an inlet port in communication with the expansion chamber for introducing and relieving pilot pressure fluid, the first plunger having a second wetted surface exposable to pilot pressure fluid in the expansion chamber such that upon introduction of pilot pressure fluid into the expansion chamber the first plunger will move into engagement with the seal member.

15. The regulator valve of claim 14 further characterized in that the second plunger engages the interior of the housing in sealing relation at a second diaphragm, the second diaphragm having an inner edge connected in sealing engagement to the second plunger and an outer edge connected in sealing engagement to the interior wall of the housing, the first diaphragm having an inner edge connected to the first plunger in sealing engagement and an outer edge connected in sealing engagement to an interior wall of the housing, the inlet port being intermediate the first and second diaphragms.

16. The regulator valve of claim 15 wherein the housing comprises an inlet body having a foot, an outlet body having a head and a central valve body between the inlet and outlet bodies and having top and bottom lands, the outer edge of the first diaphragm being held between the inlet body's foot and the central valve body's top land, the outer edge of the second diaphragm being held between the outlet body's head and the central valve body's bottom land.

17. The regulator valve of claim 16 wherein the inlet body comprises a spring sleeve including said foot.

18. The regulator valve of claim 15 further characterized in that each plunger includes a tubular stem, a flange extending from the stem, and a diaphragm retainer, the inner edge of each diaphragm being held between the flange and the diaphragm retainer.

19. The regulator valve of claim 18 wherein the spring engages the flange of the first plunger.

20. The regulator valve of claim 18 further characterized in that the tubular stems of the first and second plungers are engageable with one another in end-to-end fashion.

21. The regulator valve of claim 18 wherein the diaphragm retainer comprises a web engageable with the tubular stem to fix the diaphragm retainer on the plunger.

22. The regulator valve of claim 21 wherein the second diaphragm retainer further comprises a sleeve engageable with the tubular stem of the first plunger.

23. A regulator valve for regulating fluid pressure and selectively stopping fluid flow, comprising:
a housing defining a hollow enclosure, an inlet end and an outlet end;
a seal member disposed in the housing;
first and second plungers in the housing, each plunger including a tubular stem having a passage therethrough, the passages being in fluid communication with one another, the plungers being movable relative to one another and relative to the seal member, the first plunger being adjacent the seal member and engageable with the seal member;
first and second diaphragms each having an inner edge connected in sealing engagement to the first and second plungers, respectively, and an outer edge connected in sealing engagement to the interior wall of the housing such that fluid flowing from the inlet end to the outlet end must flow through said passages at a rate which is dependent on the separation between the seal member and the first plunger, with said passages being closed to fluid flow when the first plunger engages the seal member;

the first and second diaphragms together with the first and second plungers and the housing defining an expansion chamber suitable for receiving pilot pressure fluid therein;

an inlet port in fluid communication with the expansion chamber;

a first wetted surface on the first plunger exposed to fluid pressure in the expansion chamber to bias the first plunger toward the seal member;

a second wetted surface on the second plunger exposed to fluid pressure at the outlet end of the housing to bias the second and first plungers toward the seal member; and a spring in the housing biasing the first plunger away from the seal member.

\* \* \* \* \*